United States Patent [19]
Hagiwara

[11] Patent Number: 6,061,421
[45] Date of Patent: May 9, 2000

[54] CT IMAGING METHOD AND X-RAY CT APPARATUS

[75] Inventor: Akira Hagiwara, Tokyo, Japan

[73] Assignee: GE Yokogawa Medical Systems, Limited, Tokyo, Japan

[21] Appl. No.: 09/141,999

[22] Filed: Aug. 28, 1998

[30] Foreign Application Priority Data

Sep. 1, 1997 [JP] Japan .................................. 9-235566

[51] Int. Cl.$^7$ ....................................................... A61B 6/03
[52] U.S. Cl. ................................................. 378/4; 378/901
[58] Field of Search .................................. 378/4, 15, 901

[56] References Cited

U.S. PATENT DOCUMENTS 5,887,047  3/1999  Bailey et al. ................................. 378/4
5,982,845  11/1999  Sidoti et al. ................................. 378/4

Primary Examiner—David V. Bruce
Attorney, Agent, or Firm—Moonray Kojima

[57] ABSTRACT

In an X-ray CT imaging apparatus which is designed to produce a CT image in a short time, a master processor (MP) converts fan-view image data produced by multiple X-ray sensors into para-view image data, and thereafter distributes the resulting data to slave processors (SP1 through SP4), which are also supplied with modification data (B1 through B4). The slave processors (SP1 through SP4) implement the first pre-processing, second pre-processing, FBP process and post processing continuously, thereby producing BP data (I1 through I4). The master processor (MP) collects and composes the BP data (I1 through I4) to produce a CT image.

2 Claims, 4 Drawing Sheets

CT IMAGING METHOD AND X-RAY CT APPARATUS

BACKGROUND OF THE INVENTION

The present invention relates to a CT (Computer Tomography) imaging method and an X-ray CT apparatus, and more particularly to a CT imaging method and an X-ray CT apparatus capable of producing a CT image in a short time.

FIG. 5 is a diagram explaining the conventional CT imaging method. For the expedience of explanation, one frame of image is assumed to be composed by eight pieces of image data A11 through A42. The X-ray sensor array in use is assumed to have four channels, of which the 1st-channel sensor produces image data A11 and A12, the 2nd-channel sensor produces image data A21 and A22, the 3rd-channel sensor produces image data A31 and A32, and the 4th-channel sensor produces image data A41 and A42. The X-ray sensors of 1st through 4th channels are provided with modification data B1, B2, B3 and B4, respectively. The image data pairs A11 and A22, A21 and A32, A31 and A42, and A41 and A12 are each derived from parallel X-ray transmission paths.

The X-ray CT apparatus has a central processor, which is assumed to include a master processor MP and four slave processors SP1 through SP4.

The master processor MP groups the image data based on their originating X-ray sensors, and distributes the resulting paired data to the slave processors SP1 through SP4. At the same time, the master processor MP sends the modification data corresponding to the X-ray sensors to the slave processors SP1 through SP4.

Specifically, the first slave processor SP1 is supplied with data pair A11 and A12 produced by the 1st-channel sensor and the modification data B1 corresponding to that sensor. The second slave processor SP2 is supplied with data pair A21 and A22 produced by the 2nd-channel sensor and the modification data B2 corresponding to that sensor. The third slave processor SP3 is supplied with data pair A31 and A32 produced by the 3rd-channel sensor and the modification data B3 corresponding to that sensor. The fourth slave processor SP4 is supplied with data pair A41 and A42 produced by the 4th-channel sensor and the modification data B4 corresponding to that sensor.

Since a data pair supplied to each slave processor have fan-out X-ray transmission paths, these image data will be called "fan-view data".

The slave processors SP1 through SP4 implement the first pre-processing for the supplied data pair A11 and A12 through data pair A41 and A42 by using the supplied modification data B1 through B4, thereby producing a new data pair a11 and a12 through data pair a41 and a42.

The master processor MP collects the data pair a11 and a12 through data pair a41 and a42 produced by the slave processors SP1 through SP4, groups the data into data pairs each derived from parallel X-ray transmission paths, and distributes the paired data to the slave processors SP1 through SP4.

Specifically, the image data is grouped into data pair a11 and a22, data pair a21 and a32, data pair a31 and a42, and data pair a41 and a12, and these data pairs are supplied to the first, second, third and fourth slave processors SP1, SP2, SP3 and SP4, respectively. Since a data pair supplied to each slave processor have parallel X-ray transmission paths, these image data will be called "para-view data". The above-mentioned data grouping process from fan-view data into para-view data will be called "fan-para data conversion".

The slave processors SP1 through SP4 implement the second pre-processing for the supplied data pair a11 and a22 through data pair a41 and a12, thereby producing a new data pair $\alpha 11$ and $\alpha 22$ through data pair $\alpha 41$ and $\alpha 12$.

The slave processors SP1 through SP4 further implement the FBP (Filtered Back Projection) process for the data pair $\alpha 11$ and $\alpha 22$ through data pair $\alpha 41$ and $\alpha 12$, thereby producing new data i1 through i4. The resulting back-projected data i1 through i4 will be called "BP data".

The master processor MP collects the BP data i1 through i4 produced by the slave processors SP1 through SP4, and composes the data to produce a CT image I.

As described above, the conventional scheme is designed to distribute the fan-view data to the slave processors SP1 through SP4 to carry out the first pre-processing. It is convenient in that the slave processors SP1 through SP4 are merely supplied with the modification data B1 through B4, respectively.

However, it suffers an extended processing time due to the data transfer for the collection of data pair a11 and a12 through data pair a41 and a42 resulting from the first pre-processing to the master processor MP and the data transfer for the distribution of para-view data pair a11 and a22 through data pair a41 and a12 to the slave processors SP1 through SP4.

SUMMARY OF THE INVENTION

An object of the present invention is to provide a CT imaging method and an X-ray CT apparatus capable of producing a CT image in a shorter time.

In the first viewpoint, the invention resides in a CT imaging method carried out by an X-ray CT apparatus, in which a master processor groups multiple pieces of image data produced by a plurality of X-ray sensors of the apparatus into data groups each derived from parallel X-ray transmission paths, the master processor distributes the grouped data to a plurality of slave processors, the slave processors implement the first pre-processing for the supplied data by using modification data corresponding to the X-ray sensors that have produced the image data, the slave processors implement the second pre-processing, FBP (Filtered Back Projection) process and post processing sequentially, and the master processor collects data resulting from these processings by the slave processors and composes the data to produce a CT image.

In the CT imaging method of the first viewpoint, fan-view data is first converted into para-view data and distributed to the slave processors for undergoing the first pre-processing, instead of being distributed intact to the slave processors and rendered the first pre-processing. Although, in this case, same modification data need to be sent twice to the slave processors, the slave processors can implement the first pre-processing up to the post processing continuously, eliminating the need of collection of the output data of the first pre-processing and transfer of para-view data to the slave processors. As a result, the total processing time can be reduced, and a CT image can be produced in a shorter time.

In the second viewpoint, the invention resides in an X-ray imaging apparatus, which comprises an X-ray tube for emitting X-rays, a plurality of X-ray sensors, a master processor which groups multiple pieces of image data produced by the X-ray sensors into data groups each derived from parallel X-ray transmission paths, distributes the grouped data to a plurality of slave processors, collects output data from the slave processors and composes the data to produce a CT image, and the slave processors which implement the first pre-processing for the supplied data by using modification data corresponding to the X-ray sensors that have produced the image data, subsequently implement the second pre-processing, FBP (Filtered Back Projection) process and post processing sequentially and return output data resulting from these processings to the master processor.

The X-ray CT apparatus of the second viewpoint can properly carry out the CT imaging method of the first viewpoint, and can produce a CT image in a shorter time.

In the inventive CT imaging method and X-ray CT apparatus, the slave processors can implement the first pre-processing up to the post processing continuously, reducing the total processing time, whereby it becomes possible to produce a CT image in a shorter time.

Further objects and advantages of the present invention will become apparent from the following description of the preferred embodiments of the invention as illustrated in the accompanying drawings.

DESCRIPTION OF THE PREFERRED EMBODIMENTS

Figure 1:
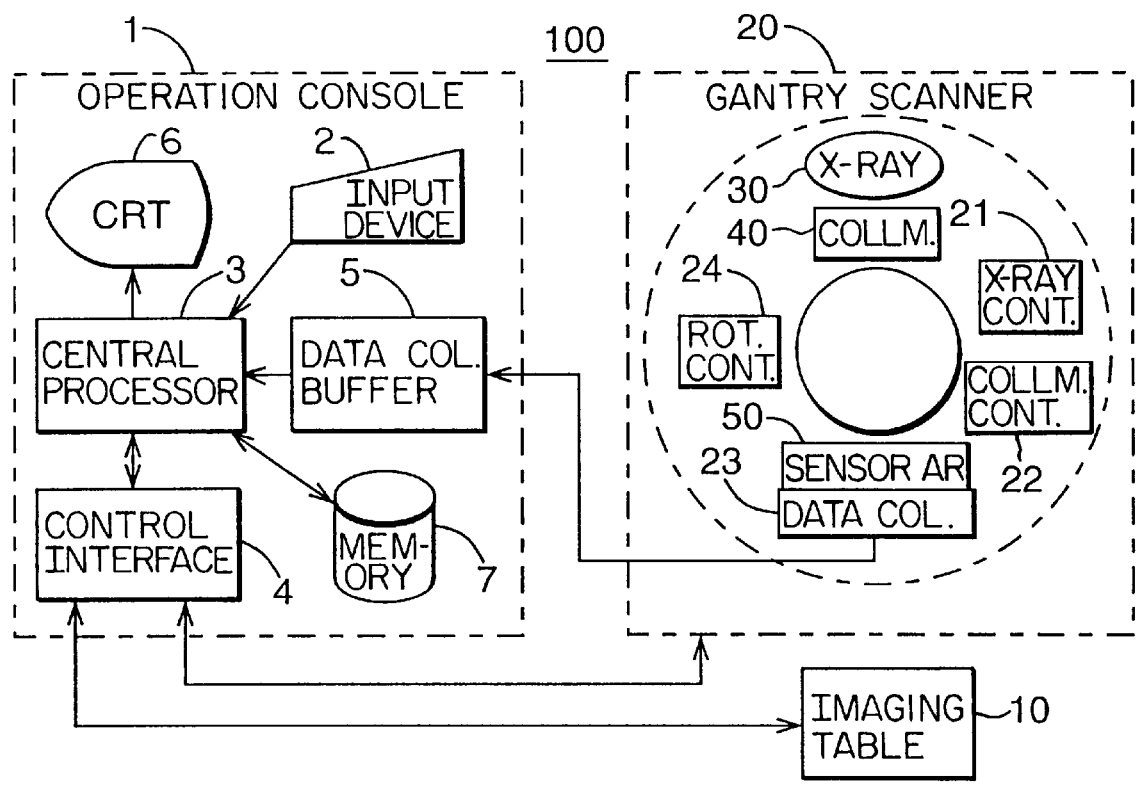
FIG. 1 is a block diagram of the X-ray CT apparatus based on a first embodiment of this invention.

The invention will be explained in more detail in connection with the following illustrated embodiments.
Embodiment 1:

FIG. 1 is a block diagram of the X-ray CT apparatus based on the first embodiment of this invention. The X-ray CT apparatus 100 has an operation console 1, an imaging table 10, and a gantry scanner 20.

The operation console 1 incorporates an input device 2 which is used by the operator to enter instructions and information, a central processor 3 which implements the imaging process and image composing process, a control interface 4 which transacts control signals with the imaging table 10 and gantry scanner 20, a data collection buffer 5 which collects image data produced by the gantry scanner 20, a CRT screen 6 which displays a CT image resulting from the composition of the image data, and a memory which stores programs and image data.

The imaging table 10, with a subject body being placed thereon, is operated to move in the longitudinal direction of the subject body.

The gantry scanner 20 incorporates an X-ray controller 21, a collimator controller 22, an X-ray tube 30, a collimator 40, a sensor array 50 which consists of multiple X-ray sensors, a data collector 23, and a rotation controller 24 which operates to turn the X-ray tube 30, etc. around the longitudinal axis of the subject body.

Figure 2:
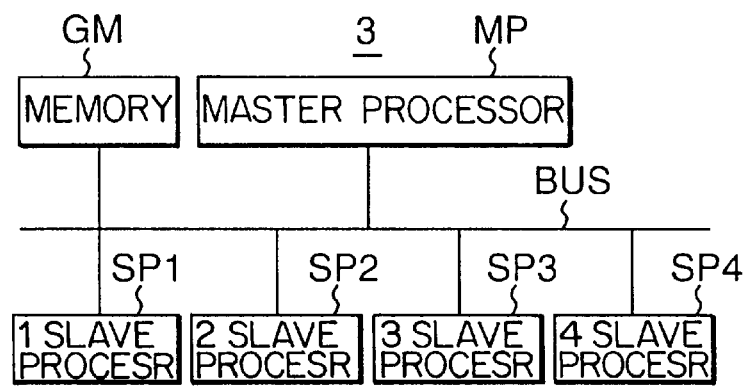
FIG. 2 is a block diagram showing the principal arrangement of the central processor of the apparatus.

FIG. 2 shows the principal arrangement of the central processor 3. The central processor 3 includes a master processor MP, four slave processors SP1 through SP4, a memory GM, and an internal bus BUS.

Figure 3:
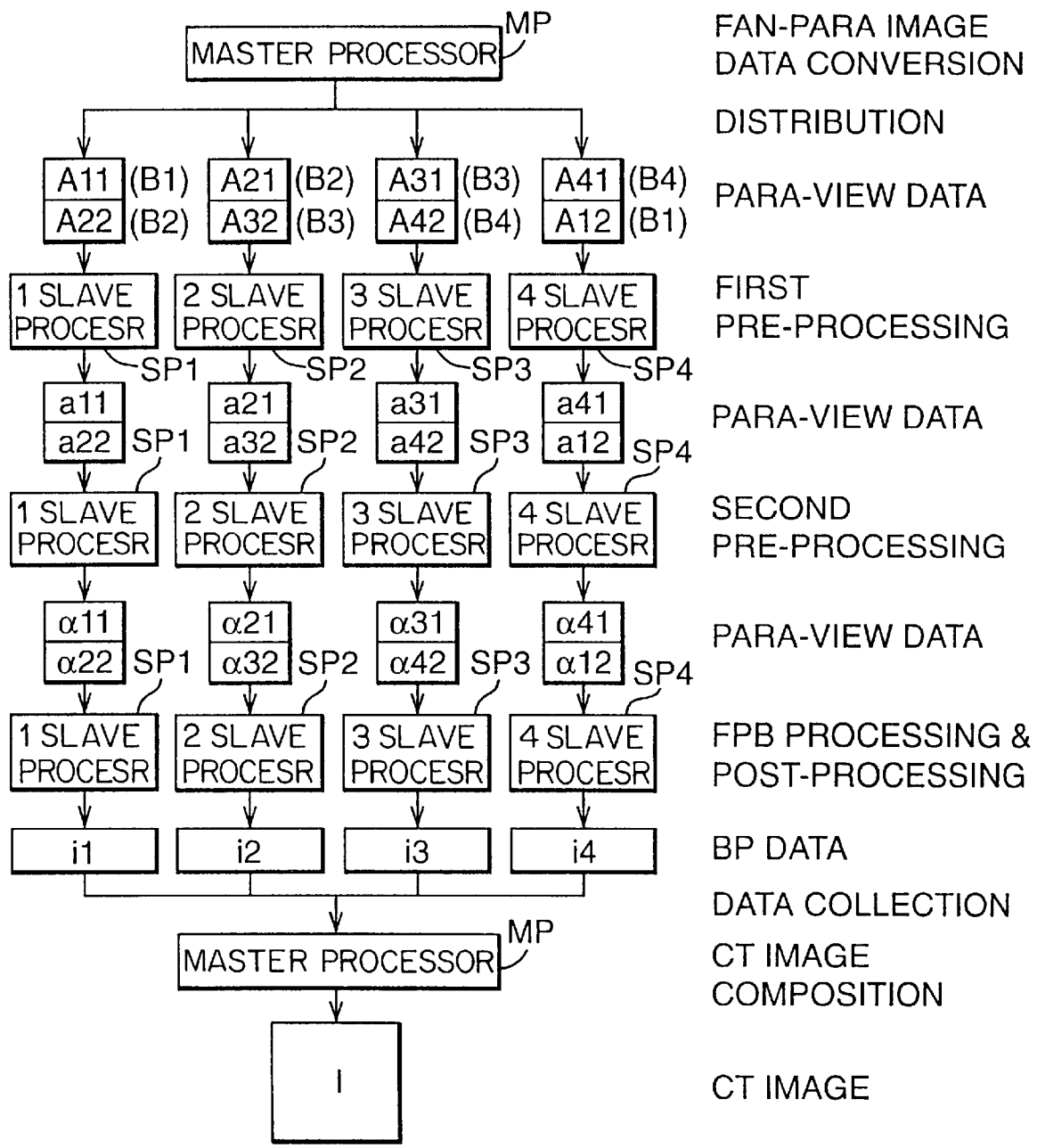
FIG. 3 is an explanatory diagram of the CT imaging process implemented by the central processor shown in FIG. 1.
Figure 4:
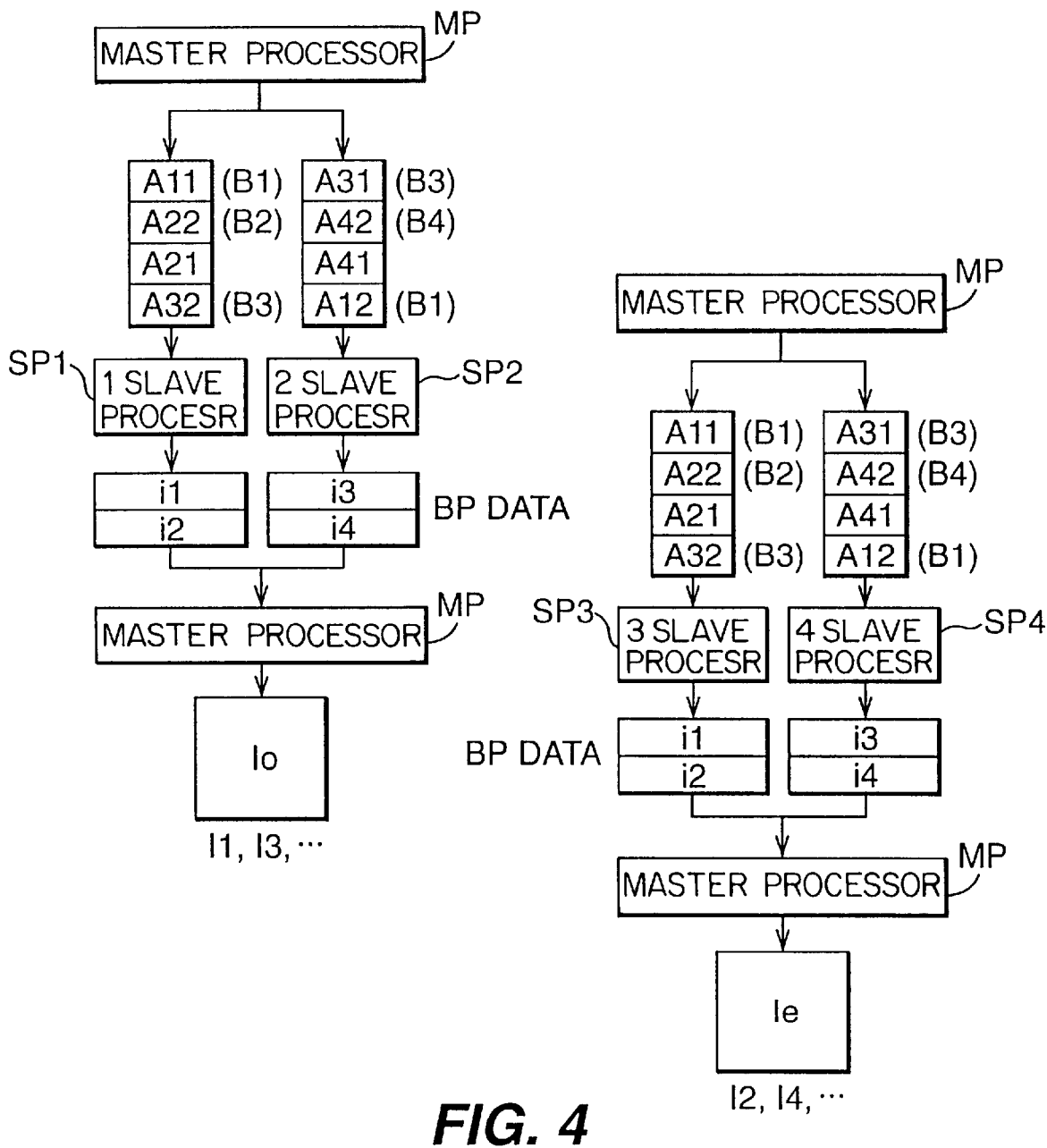
FIG. 4 is an explanatory diagram of the CT imaging process based on a second embodiment of this invention.
Figure 5:
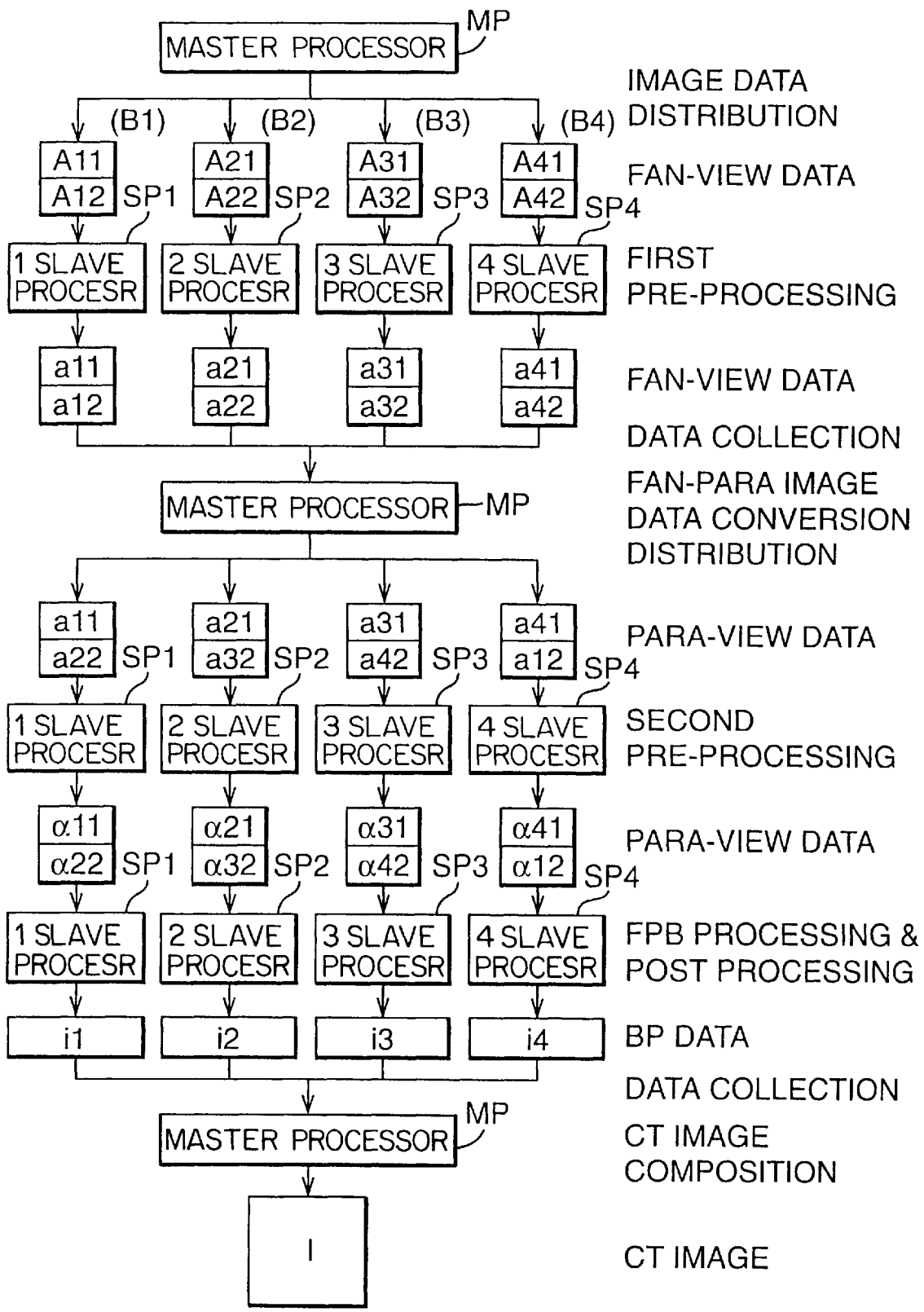
FIG. 5 is an explanatory diagram of the conventional CT imaging process.

FIG. 3 explains the CT imaging process implemented by the central processor 3. For the expedience of explanation, one frame of image, is assumed to be composed by eight pieces of image data A11 through A42. The X-ray sensor array is assumed to have four channels, of which the 1st-channel sensor produces image data A11 and A12, the 2nd-channel sensor produces image data A21 and A22, the 3rd-channel sensor produces image data A31 and A32, and the 4th-channel sensor produces image data A41 and A42. The X-ray sensors of 1st through 4th channels are provided with modification data B1, B2, B3 and B4, respectively. The image data pairs A11 and A22, A21 and A32, A31 and A42, and A41 and A12 are each derived from parallel X-ray transmission paths.

The master processor MP groups the image data produced by each of X-ray sensors into data pairs each derived from parallel X-ray transmission paths, and distributes the resulting paired data to the slave processors SP1 through SP4. At the same time, the master processor MP sends the modification data corresponding to the X-ray sensors to the slave processors SP1 through SP4.

Specifically, the image data A11 and A12 produced by the 1st-channel sensor, image data A21 and A22 produced by the 2nd-channel sensor, image data A31 and A32 produced by the 3rd-channel sensor, and image data A41 and A42 produced by the 4th-channel sensor are grouped into data pair A11 and A22, data pair A21 and A32, data pair A31 and A42, and data pair A41 and A12, each derived from parallel X-ray transmission paths. The first slave processor SP1 is supplied with the data pair A11 and A22 and the modification data B1 and B2 corresponding to the 1st and 2nd-channel sensors. The second slave processor SP2 is supplied with the data pair A21 and A32 and the modification data B2 and B3 corresponding to the 2nd and 3rd channel sensors. The third slave processor SP3 is supplied with the data pair A31 and A42 and the modification data B3 and B4 corresponding to the 3rd and 4th channel sensors. The fourth slave processor SP4 is supplied with the data pair A41 and A12 and the modification data B4 and B1 corresponding to the 4th and 1st channel sensors. Since a data pair supplied to each slave processor have parallel X-ray transmission paths, these image data will be called "para-view data". The above-mentioned data grouping process from fan-view data into para-view data will be called "fan-para data conversion".

The slave processor SP1 implements the first pre-processing for the supplied data pair A11 and A22 by using the supplied modification data B1 and B2 thereby to produce a new data pair a11 and a22. Similarly, the slave processor SP2 implements the first pre-processing for the supplied data pair A21 and A32 by using the supplied modification data B2 and B3 thereby to produce a new data pair a21 and a32. The slave processor SP3 implements the first pre-processing for the supplied data pair A31 and A42 by using the supplied modification data B3 and B4 thereby to produce a new data pair a31 and a42. The slave processor SP4 implements the first pre-processing for the supplied data pair A41 and A12 by using the supplied modification data B4 and B1 thereby to produce a new data pair a41 and a12.

Subsequently, the slave processors SP1 through SP4 implement the second pre-processing for the data pair a11 and a22 through data pair a41 and a12 to produce new data pair $\alpha 11$ and $\alpha 22$ through data pair $\alpha 41$ and $\alpha 12$.

The slave processors SP1 through SP4 further implement the FBP process for the data pair $\alpha 11$ and $\alpha 22$ through data pair α41 and α12, and implement the post processing, thereby producing new data i1 through i4. The resulting back-projected data i1 through i4 will be called "BP data".

The master processor MP collects the BP data i1 through i4 produced by the slave processors SP1 through SP4, and composes the data to produce a CT image I.

According to the foregoing X-ray CT apparatus 100, although same modification data need to be sent twice to the slave processors SP1 through SP4, the slave processors can implement the first pre-processing up to the post processing continuously. As a result, the total processing time can be reduced, and a CT image can be produced in a shorter time.

Embodiment 2:

In the case of producing CT images continuously, the four slave processors SP1 through SP4 are divided into 1st-group slave processors SP1 and SP2 and 2nd-group slave processors SP3 and SP4. The 1st-group slave processors SP1 and SP2 operate to produce odd-numbered CT images I1, I3, I5, and so on in the same manner as the preceding first embodiment, while the 2nd-group slave processors SP3 and SP4 operate to produce even-numbered CT images I2, I4, I6, and so on in the same manner as the first embodiment.

In contrast to the first embodiment, in which the master processor MP needs to collect the BP data I1 through I4 from the four slave processors SP1 through SP4, it is sufficient for the master processor MP of the second embodiment to collect the BP data I1 through I4 only from the two slave processors SP1 and SP2, or SP3 and SP4, whereby the data transfer time can be reduced.

Many widely different embodiments of the invention may be constructed without departing from the spirit and the scope of the present invention. It should be understood that the present invention is not limited to the specific embodiments described in the specification, except as defined in the appended claims.

I claim:

1. A CT imaging method carried out by an X-ray CT apparatus, in which a master processor groups multiple pieces of image data produced by a plurality of X-ray sensors of the apparatus into data groups each derived from parallel X-ray transmission paths, the master processor distributes the grouped data to a plurality of slave processors, the slave processors implement the first pre-processing for the supplied data by using modification data corresponding to the X-ray sensors that have produced the image data, the slave processors implement the second pre-processing, FBP (Filtered Back Projection) process and post processing sequentially, and the master processor collects data resulting from these processings by the slave processors and composes the data to produce a CT image.

2. An X-ray imaging apparatus, comprising:

an X-ray tube for emitting X-rays;

a plurality of X-ray sensors;

a master processor which groups multiple pieces of image data produced by the X-ray sensors into data groups each derived from parallel X-ray transmission paths, distributes the grouped data to a plurality of slave processors, collects output data from the slave processors and composes the data to produce a CT image; and the slave processors which implement the first pre-processing for the supplied data by using modification data corresponding to the X-ray sensors that have produced the image data, subsequently implement the second pre-processing, FBP (Filtered Back Projection) process and post processing sequentially and return output data resulting from these processings to the master processor.

* * * * *